United States Patent Office 3,528,456
Patented Sept. 15, 1970

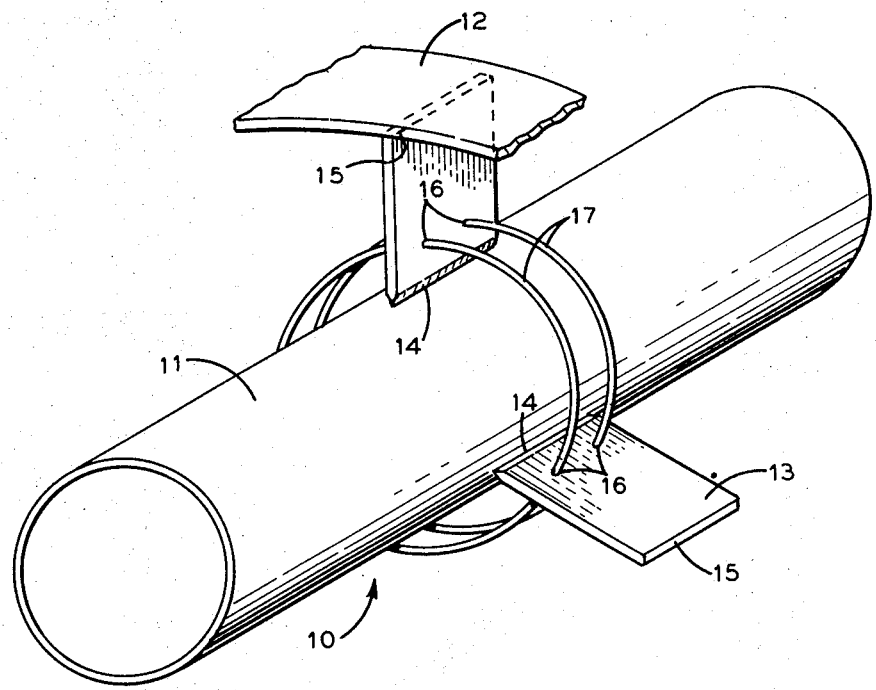
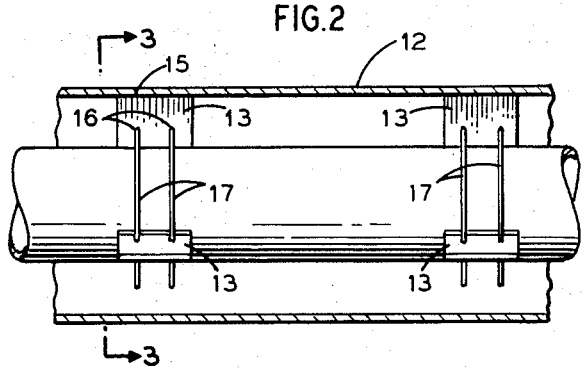
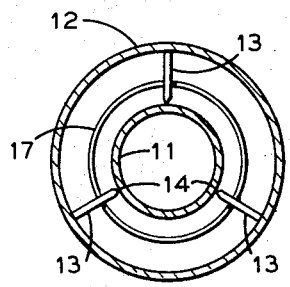

3,528,456
COAXIAL TUBULAR MEMBERS SPACED WITH INSULATING SPACER MEANS
Ernst Scheffler, Langenhagen, Germany, assignor to Kabel- und Metallwerke Gutehoffnungshutte Aktiengesellschaft, Hannover, Germany, a corporation of Germany
Filed Jan. 8, 1969, Ser. No. 789,700
Claims priority, application Germany, Jan. 9, 1968, 1,675,323
Int. Cl. F16l *9/18;* H01b *9/04*
U.S. Cl. 138—113          6 Claims

ABSTRACT OF THE DISCLOSURE

A separator construction for maintaining a plurality of coaxially related tubular members in spaced relation to each other to provide maximum insulating effect for minimizing the transmission of cold or heat therethrough. The separator construction including a plurality of plate members having opposite edges thereof abutting opposed surface portions of the respective tubular members, and ring means for interconnecting the plate members in circumferentially spaced relation to each other.

BACKGROUND OF THE INVENTION

Cables for the transmission of electrical energy under cryogenic conditions are known in the art. In such cables the cable core conductors are disposed within a transversely corrugated tubular conduit which is filled with liquid helium. A series of corrugated tubular conduits of successively larger diameter are coaxially related to the conduit carrying the cable core and helium, to insulate the same. The resultant tubular innerspace is evacuated while the next tubular interspace is filled with liquid nitrogen to distribute the temperature gradient in radially outward directions from the axis of the cable core carrying member. A third tubular interspace is also evacuated to complete the insulating assembly.

For transporting fluids and gases coaxial conduit systems are known in the art, using at least two concentric tubular members. By using three concentric tubular members, the innermost member provides an outgoing conduit for the liquid medium, while the annular space between the outermost and intermediate members provides an incoming conduit for the liquid medium. The annular space between the innermost and intermediate members provides insulation as by being filled with heat insulating plastic foams or the like. When only two concentric tubular members are used, the inner tube is used as a conduit for the fluid or gas being transmitted, while the space between the two members provides insulation such as foam, fiber or by way of evacuation.

For centering and maintaining the coaxial tubular members in proper relation to each other, it has been proposed to use rodlike members in helical form as means for separating the tubular members. However, with such known separators, it has been found that there are excessive heat losses, particularly with temperature gradients in cryogenic systems or very high temperature installations. Attempts have been made to reduce the heat losses by careful selection of the spacer material, as for example polytetrafluoroethylene and the like. However, the resultant heat losses have been still found to be excessive for economical designs.

Accordingly, an object of this invention is to provide improved spacer means for concentric multi-tubular systems subject to very low temperatures as in electric cable systems operating under cryogenic conditions; or those used for transporting heated or cooled fluids or gases.

Another object of this invention is to provide spacer means of the character described, the same comprising a plurality of radially disposed members at longitudinally spaced positions; the members having a selected structure and being formed of selected materials to markedly reduce heat losses.

A further object of this invention is to provide spacer means of the character described, which show a high resistance to mechanical load, yet are of a design to provide contact surfaces of minimum dimension so as to reduce heat losses.

Still another object of this invention is to provide spacer means of the character described, which includes separate spacer elements and wire members for holding the spacer elements in angularly spaced, radial positions.

Other objects of this invention will in part be obvious and in part hereinafter pointed out.

BRIEF DESCRIPTION OF THE DRAWING

FIG. 1 is a perspective view showing an insulation spacer assembly embodying the invention;
FIG. 2 is a longitudinal sectional view thereof; and
FIG. 3 is a transverse sectional view taken on the line 3—3 of FIG. 2.

DESCRIPTION OF THE PREFERRED EMBODIMENT

As shown in FIGS. 1–3, 10 designates a coaxial tubular member system utilizing spacer means embodying the invention. The same comprises an inner tubular member 11 and an outer tubular member 12 in coaxial relation to each other to form an annular space therebetween. The inner member 11 may provide means for carrying a cable core, not shown, under cryogenic conditions, as by the use of liquified helium or the like; or alternatively, for transporting heated or cooled liquids or gases.

The outer member 12 provides an annular insulating space between it and inner member 11. Means is provided for maintaining tubular members 11, 12 in such spaced relation; the same comprising longitudinally spaced sets of spacer members 13.

Members 13 take the form of flat rectangular plates having sharp knife edges 14 at one end thereof and flat edges 15 at the other end thereof. Each set of spacer members 13, which may be three in number, are located at 120° intervals about inner member 11, the knife edges 14 thereof bearing on the outer surface of tubular member 11 and being parallel to the longitudinal axis thereof.

Members 13 are held in their angularly related positions by small diameter wire rings 17 which pass through openings 16 in plates 13. To facilitate mounting, rings 17 may be of the split, spring type, with a preferred circular cross section.

The members 13 are formed of low heat conductivity materials, such as polymethyl methacrylate or other plastic or non-plastic materials having good resistance to heat passage.

It has been found that excellent insulation is achieved with the construction shown, particularly when wires 17 are located uniformly with respect to the longitudinal axis of inner member 11 so that the rings are oriented about an isotherm, thereby avoiding a temperature gradient on the rings which would cause further heat losses. The rings 17 are preferably located adjacent the opposite side edges of plates 13, to thereby achieve good resistance to mechanical load on the system 10.

The dimensions of plates 13 can be minimal to reduce heat losses, yet are well adapted to maintain tubular members 11, 12 in proper spaced relation. Also, the rings 17 are of minimum cross sectional diameter, and such cross section may be other then circular, although the circular cross section is preferred. The dimension of outer edges 15 on plates 13 may be further reduced to bring heat transfer losses to a minimum, yet capable of providing resistance to mechanical strains.

It is understood that the system may include more than two concentric tubular members, and therefore providing more then one annular space. Similar spacer plates 13 may be used in the additional annular spaces, as described above. Also, more than three plates 13 may be used to separate members 11, 12; the plates being suitably disposed in appropriate angular relation.

I claim:

1. In combination with a pair of coaxial tubular members providing an annular space therebetween, spacer means for maintaining said tubular members in coaxial relation to each other, said spacer means comprising a plurality of plate members in separated, angularly related and radially extending relation to each other, each plate member having an outer edge portion in abutting relation to an inner surface portion of the outer tubular member along a line parallel to the longitudinal axes of said tubular members, and an inner edge portion of transversely reduced dimension in abutting relation to an outer surface portion of the inner tubular member along a line parallel to the longitudinal axes of said tubular members, and ring means concentrically related to said tubular members and interconnecting said angularly related plate members.

2. The combination as in claim 1 wherein said plate members are formed with knife edge portions at the inner edges thereof.

3. The combination as in claim 1, wherein said ring means comprises a pair of ring members in parallel relation, said ring members passing through said plate members at points adjacent the opposite radial edges thereof.

4. The combination as in claim 3 wherein said rings are split and formed of spring metal.

5. The combination as in claim 1 wherein said plate members are formed of materials having a low thermal conductivity.

6. The combination as in claim 5 wherein said plate members are formed of polymethyl methacrylate.

References Cited

UNITED STATES PATENTS

| Re. 23,545 | 9/1952 | Bond | 138—113 |
| 3,296,688 | 1/1967 | Hervig | 138—113 X |
| 3,332,446 | 7/1967 | Mann | 138—114 |

FOREIGN PATENTS

| 647,150 | 7/1937 | Germany. |
| 905,992 | 3/1954 | Germany. |
| 538,119 | 7/1941 | Great Britain. |
| 1,083,185 | 9/1967 | Great Britain. |

LARAMIE E. ASKIN, Primary Examiner

U.S. Cl. X.R.

174—28, 99